(12) United States Patent
Arnold et al.

(10) Patent No.: US 9,169,925 B2
(45) Date of Patent: Oct. 27, 2015

(54) METHOD FOR TERMINATING A GEARSHIFT FOR AN AUTOMATIC TRANSMISSION FOR A MOTOR VEHICLE WHEREIN AT LEAST ONE POSITIVE-LOCKING SHIFTING ELEMENT IS INVOLVED

(71) Applicant: ZF Friedrichshafen AG, Friedrichshafen (DE)

(72) Inventors: Jörg Arnold, Immenstaad (DE); Andreas Schmidt, Bavendorf (DE); Johannes Brockmann, Lindau (DE)

(73) Assignee: ZF Friedrichshafen AG, Dority & Manning, P.A. (DE)

( * ) Notice: Subject to any disclaimer, the term of this patent is extended or adjusted under 35 U.S.C. 154(b) by 0 days.

(21) Appl. No.: 14/465,205

(22) Filed: Aug. 21, 2014

(65) Prior Publication Data
US 2015/0057900 A1 Feb. 26, 2015

(51) Int. Cl.
*F16H 61/16* (2006.01)
*F16H 61/02* (2006.01)

(52) U.S. Cl.
CPC ............ *F16H 61/16* (2013.01); *F16H 61/0204* (2013.01); *F16H 2200/2094* (2013.01)

(58) Field of Classification Search
CPC .................... F16H 2059/385; F16H 2059/425; F16H 59/46; F16H 61/16; F16H 61/0204; B60W 2510/102; B60W 2510/1016; B60W 2510/10; Y10T 477/688
See application file for complete search history.

(56) References Cited

U.S. PATENT DOCUMENTS

| 5,620,390 A * | 4/1997 | Kono et al. ...................... 477/65 |
| 6,231,479 B1 * | 5/2001 | Kraska et al. .................. 477/143 |
| 2008/0119327 A1 * | 5/2008 | Kitaori et al. .................. 477/120 |

FOREIGN PATENT DOCUMENTS

DE      10 2009 015 165 A1      10/2010

OTHER PUBLICATIONS

German Patent Office Search Report, Jun. 2, 2014.

* cited by examiner

*Primary Examiner* — Justin Holmes
(74) *Attorney, Agent, or Firm* — Dority & Manning, P.A.

(57) ABSTRACT

A method for terminating a gearshift for an automatic transmission for a motor vehicle is provided, wherein a positive-locking shifting element is involved. After the initiation of the gearshift, there is an evaluation of the continuous signals of at least one control unit of the vehicle, which affect the engine torque and thus the turbine speed gradient. Based on the evaluation of the signals, an upcoming change to the turbine speed gradient that exceeds a first predetermined threshold value or falls short of a second predetermined threshold value is detected, and, upon such detection, the gearshift is terminated.

4 Claims, 2 Drawing Sheets

|  | A | B | C | D | E | F |
|---|---|---|---|---|---|---|
| D1 | X |  |  | X |  | X |
| D2 | X |  | X |  |  | X |
| D3 | X | X |  |  |  | X |
| D4 |  |  |  |  | X | X |
| D5 | X | X |  |  | X |  |
| D6 | X |  | X |  | X |  |
| D7 | X |  |  | X | X |  |
| D8 |  |  | X | X | X |  |
| D9 |  | X |  | X | X |  |

METHOD FOR TERMINATING A GEARSHIFT FOR AN AUTOMATIC TRANSMISSION FOR A MOTOR VEHICLE WHEREIN AT LEAST ONE POSITIVE-LOCKING SHIFTING ELEMENT IS INVOLVED

FIELD OF THE INVENTION

The present invention relates to a method for terminating a gearshift for an automatic transmission for a motor vehicle, wherein at least one engaged positive-locking shifting element is involved.

BACKGROUND

With automatic transmissions of motor vehicles, which use positive-locking shifting elements in addition to friction-locking shifting elements, during gearshifts, the shifting command for closing the at least one positive-locking shifting element is triggered by means of the application of force (through, for example, electromechanical actuators, the application of hydraulic or pneumatic force, etc). by the transmission software with a certain temporal suspension prior to achieving the point of synchronization of the at least one positive-locking shifting element Through this, after the expiration of the existing delays (in particular, signal propagation delays, hydraulic delays, the covering of the stretch for the closing of the positive-locking shifting element, etc), a pre-defined differential rotational speed window for the actual single-track process for the positive-locking shifting element is met.

This approach is especially important if, upon a downshift and the engagement of a gear, one engaged shifting element is a positive-locking shifting element.

In particular with hydraulically actuated positive-locking shifting elements in automatic transmissions, the temporal suspension prior to reaching the point of synchronization is strongly dependent on the temperature of the transmission oil.

The required temporal suspension for the triggering of the closing of a positive-locking shifting element may be determined from trials, and in an automatic transmission is calculated from the turbine speed gradient.

If, after the triggering of the signal for the closing of the positive-locking shifting element, a spontaneous change to the turbine speed gradient exceeding a predetermined threshold value arises, the differential rotational speed window necessary for the harmless engagement of the positive-locking shifting element, in a disadvantageous manner, can no longer be achieved because of the very low shift time of the shifting element up to the form lock, even through countermeasures.

SUMMARY

The present invention is subject to the task of specifying a method for terminating a gearshift for an automatic transmission for a motor vehicle, wherein at least one engaged positive-locking shifting element is involved. Additional objects and advantages of the invention will be set forth in part in the following description, or may be obvious from the description, or may be learned through practice of the invention.

In the event that the change to the turbine speed gradient exceeds a predetermined threshold, by which a secure ending of the gearshift through the closing of the positive-locking shifting element is no longer ensured, such a gearshift should be terminated as early as possible through the method. The method in accordance with the invention is feasible particularly for downshifts and for the engagement of a gear.

This task is solved by the characteristics of embodiments set forth in the claims, including the additional arrangements and advantages under the invention arise from the sub-claims.

Accordingly, a method for terminating a gearshift for an automatic transmission for a motor vehicle, wherein at least one positive-locking shifting element is involved, within the framework of which, after the initiation of the gearshift, there is an evaluation of the continuous signals of at least one control unit of the vehicle, which affect the engine torque and thus the turbine speed gradient, in order to detect an effect on the turbine speed gradient that is strong in the short term and unfavorable for the gearshift, and to securely terminate a critical gearshift at an early stage.

For example, signals from the transmission's ESP control unit, ABS control unit and/or TCS (traction control system) control unit can be evaluated, since such control units can demand more engine torque or reduce the engine torque. In addition, signals can be used by other driving dynamics control systems of the vehicle.

Based on the evaluation of the signals, an upcoming change to the turbine speed gradient that exceeds a first predetermined threshold value or falls short of a second predetermined threshold value is detected, whereas, upon the detection of an upcoming change to the turbine speed gradient that exceeds the first predetermined threshold value or falls short of the second predetermined threshold value, the gearshift is terminated.

For example, upon the commencement of a gearshift (i.e., directly after the shifting command), a leading engine break signal can be constantly read by the ESP control unit (i.e., from the control unit for the electronic stability program). If the engine break signal exceeds a first predetermined threshold value or falls short of a second predetermined threshold value, a corresponding upcoming change to the turbine speed gradient that exceeds a first predetermined threshold value or falls short of a second predetermined threshold value is detected, and the gearshift is terminated.

Thereby, it can be provided that the gearshift is terminated if the engine break signal exceeds a first predetermined threshold value or falls short of a second predetermined threshold value, and an interruption counter exceeds a predetermined threshold value.

The approach for an ABS control unit and a TCS control unit of the vehicle can proceed by analogy to the approach described for the ESP control unit.

In the event that the engaged positive-locking shifting element has still not been actuated, it will be terminated in the actual gear, whereas in the event that the positive-locking shifting element has already been actuated, the transmission will be open momentarily.

BRIEF DESCRIPTION OF THE FIGURES

In the following, the invention is more specifically illustrated as an example on the basis of the attached figures. The following is shown.

DETAILED DESCRIPTION

Figures 1, 2:
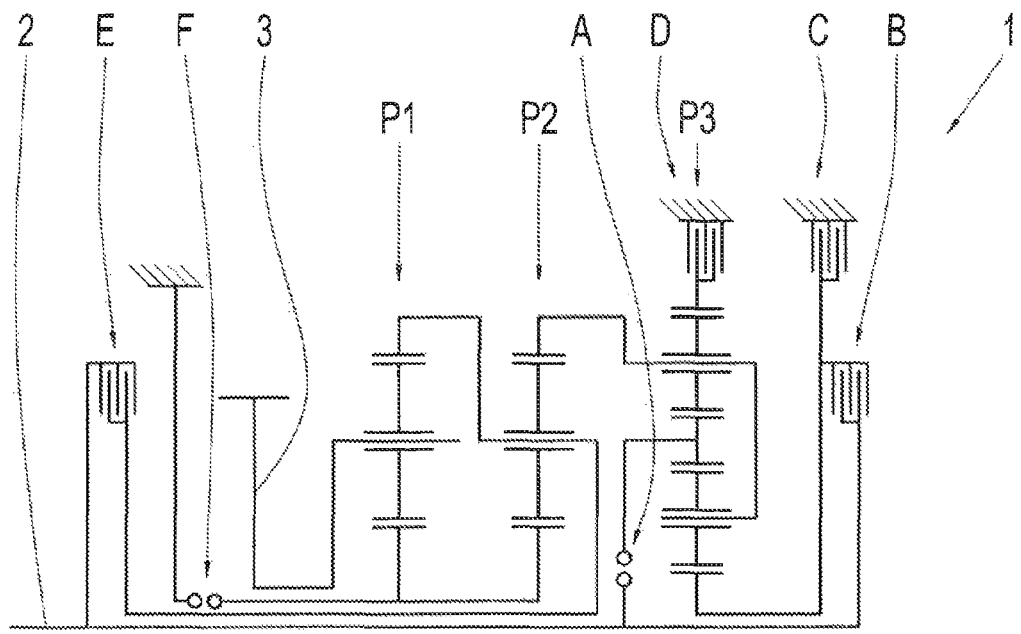
FIG. 1: a schematic representation of a multi-stage transmission with a planetary design, which features two positive-locking shifting elements and four friction-locking shifting elements.
FIG. 2: an exemplary gearshift diagram for a multi-stage transmission in accordance with FIG. 1.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The subject matter of FIG. 1 is a multi-stage transmission 1 with a planetary design known from the state of the art, which features a drive shaft 2, an output shaft 3, multiple rotating shafts, a first planetary gear set P1, a second planetary gear set P2 and a third planetary gear set P3.

The transmission 1 also features six shifting elements, comprised of a first and a second brake C, D and a first, second, third and fourth clutch A, B, E, F, the selective engagement of which brings about various transmission ratios between the drive shaft 2 and the output shaft 3, such that there are nine forward gears. Thereby, the first and fourth clutch A, F are designed as positive-locking shifting elements, whereas the second and third clutch B, E are designed as friction-locking multi-disk shifting elements.

The subject matter of FIG. 2 is a gearshift diagram corresponding to the multi-stage transmission shown in FIG. 1. As can be seen from FIG. 2, upon a downshift from the fifth forward gear D5 to the fourth forward gear D4, the fourth clutch F, designed as a positive-locking shifting element, is the engaged shifting element. In addition, upon a downshift from the fourth forward gear D4 to the third forward gear D3, the first clutch A, designed as a positive-locking shifting element, is the engaged shifting element.

The method in accordance with the invention may be carried out with these two downshifts (for example), in order to securely terminate such gearshifts at an early stage if there is an unfavorable course of the turbine speed gradient.

Figure 3:
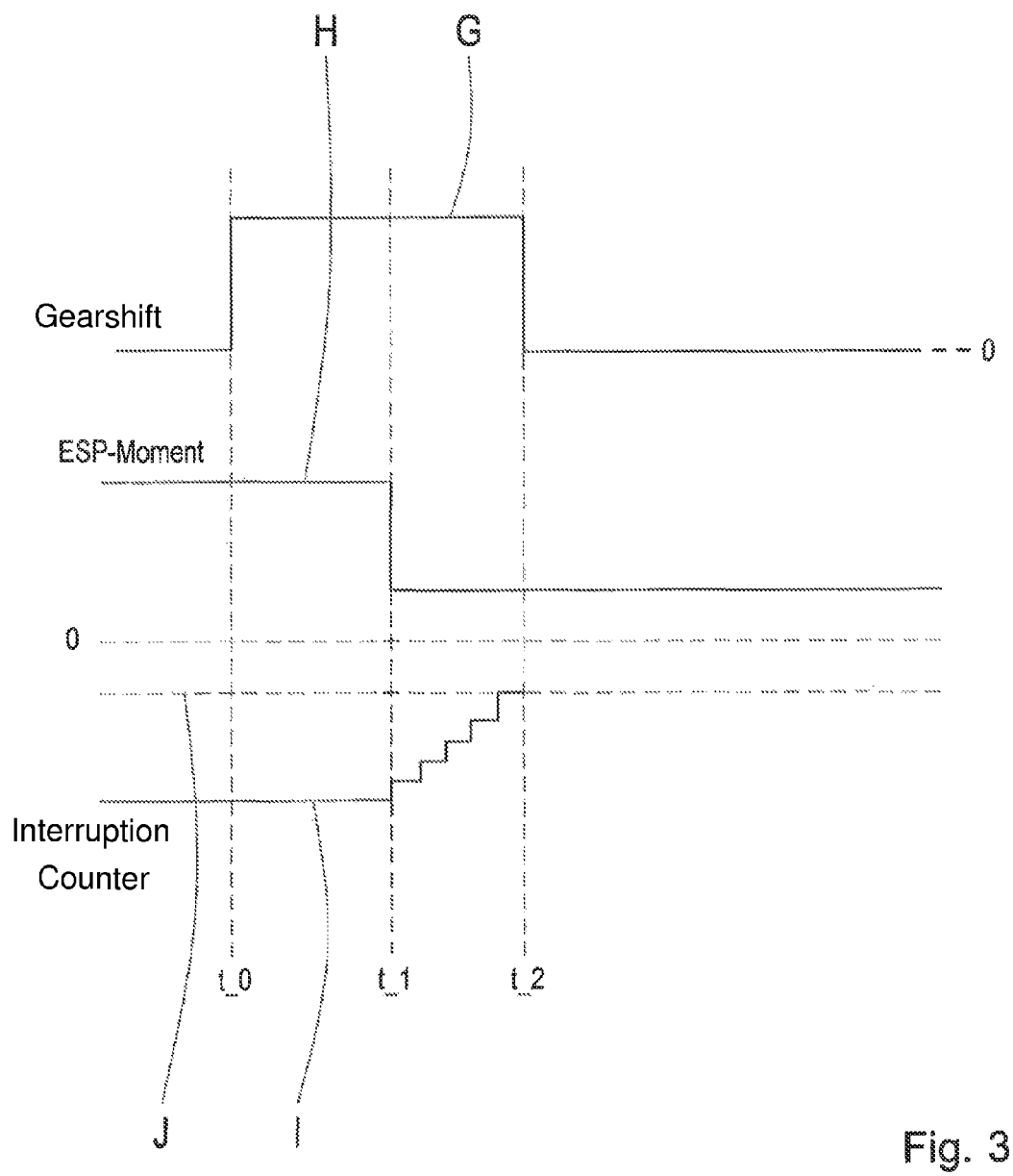
FIG. 3: the course of the state of a gearshift, of the engine torque demanded by the ESP control unit and of an interruption counter, for illustrating the method in accordance with the invention.

In the attached FIG. 3, the curve G represents the course of the state of a gearshift, in which an engaged positive-locking shifting element is involved as a function of time, whereas the state 1 corresponds to an active gearshift and the state 0 corresponds to an inactive gearshift that is not initiated or is terminated. Curve H represents the course of the engine torque demanded by the ESP control unit as a function of time.

In addition, curve I represents the chronological state of an interruption counter, whereas the line J represents the threshold value for the interruption counter.

With reference to FIG. 3, the gearshift is initiated at the point in time t_0, whereas, at the point in time t_1 during the gearshift, the engine torque demanded by the ESP control unit is significantly reduced, and falls short of a threshold. Thereby, one interruption counter per predetermined time unit is the unit of the demand of the reduced engine torque in order to increase a predetermined value, whereas a predetermined threshold value for the interruption counter is exceeded at the point in time t_2.

Upon the exceeding of the threshold value for the interruption counter, in the event that the engaged positive-locking shifting element still has not been actuated, it will be terminated in the actual gear, whereas in the event that the positive-locking shifting element has already been actuated, the transmission will be open momentarily.

Through the concept in accordance with the invention, in a simple and cost-effective manner, an upcoming change to the turbine speed gradient that is unfavorable for the gearshift is detected at an early stage and the gearshift is terminated, since, in such a situation, a secure ending of the gearshift through the closing of the positive-locking shifting element is no longer ensured.

Modifications and variations can be made to the embodiments illustrated or described herein without departing from the scope and spirit of the invention as set forth in the appended claims.

The invention claimed is:

1. A method for terminating a gearshift in an automatic transmission of a motor vehicle, wherein the gearshift requires actuation of a positive-locking shifting element, comprising:
   after initiation of the gearshift, evaluating a continuous signal of a control unit of the vehicle to determine changes in turbine speed gradient resulting from changes in engine torque; and
   based on the evaluation, terminating the gearshift when the continuous signal indicates that turbine speed gradient will exceed a first predetermined threshold value or fall short of a second predetermined threshold value.

2. The method as in claim 1, wherein in the event that the gearshift is terminated and the positive-locking shifting element is not yet actuated, the gearshift is terminated with the transmission in gear, and wherein in the event that the gearshift is terminated and the positive-locking shifting element has been actuated, the transmission is open.

3. The method as in claim 2, wherein the control unit is one or a combination of ESP (Electronic Stability) control unit, ABS (Anti-lock Braking System) control unit, or TCS (Traction Control System) control unit, and the evaluated continuous signal is an engine break signal generated by the control unit.

4. The method as in claim 3, wherein the gearshift is terminated when the engine break signal exceeds a first predetermined threshold value or falls short of a second predetermined threshold value and an interruption counter exceeds a predetermined threshold value during the time when the engine break signal exceeds the first predetermined threshold value or falls short of the second predetermined threshold value.

* * * * *